No. 609,395. Patented Aug. 16, 1898.
W. H. ATWOOD.
PLUMB LEVEL.
(Application filed June 26, 1897.)
(No Model.)

Witnesses
Wm F. Heming
Wm M. Rheem

Inventor
Wm H. Atwood
by Elliott & Hopkins
Attys.

THE NORRIS PETERS CO., PHOTO-LITHO., WASHINGTON, D. C.

UNITED STATES PATENT OFFICE.

WILLIAM H. ATWOOD, OF LINCOLN, NEBRASKA.

PLUMB-LEVEL.

SPECIFICATION forming part of Letters Patent No. 609,395, dated August 16, 1898.

Application filed June 26, 1897. Serial No. 642,420. (No model.)

*To all whom it may concern:*

Be it known that I, WILLIAM H. ATWOOD, a citizen of the United States, residing at Lincoln, in the county of Lancaster and State of Nebraska, have invented certain new and useful Improvements in Levels or Plumbs, of which the following is a full, clear, and exact specification.

My invention relates to devices for ascertaining whether a given surface, either upright or horizontal, is at right angles to the vertical; and my invention has for its primary object to provide a level or plumb with an indicator which shall be universally oscillatory, whereby deviations from such right angle in all directions may be simultaneously detected, or detected by a single application or placing of the plumb or level against the surface to be tested, so that when applied to an upright it may be instantly determined not only whether the same deviates from a right angle to a horizontal line, but also whether it deviates from a right angle to a horizontal plane or deviates in any direction, and when applied to a horizontal surface inclinations from a dead-level in any direction may be detected with the same facility and accuracy.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

Figure 1:
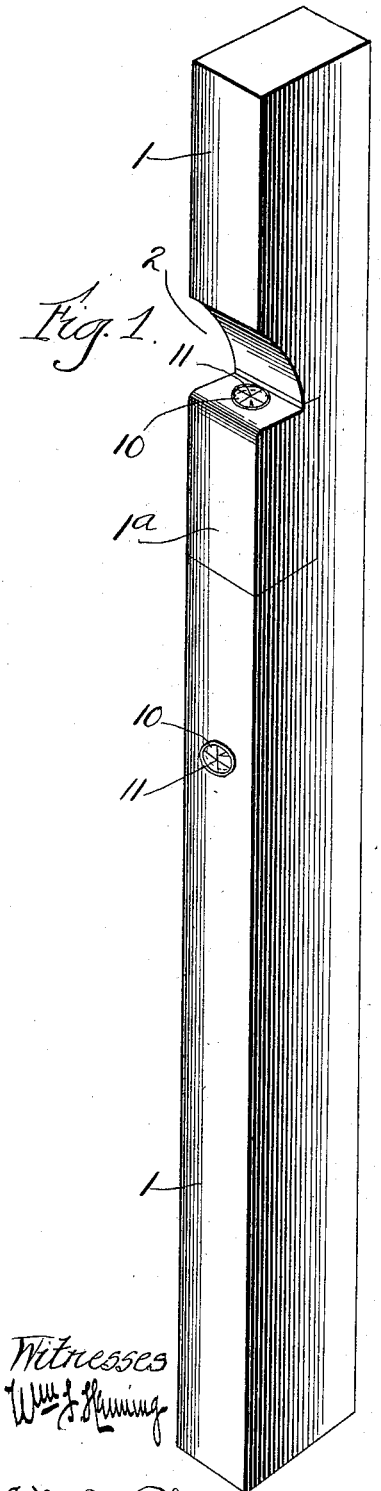
Figure 2:
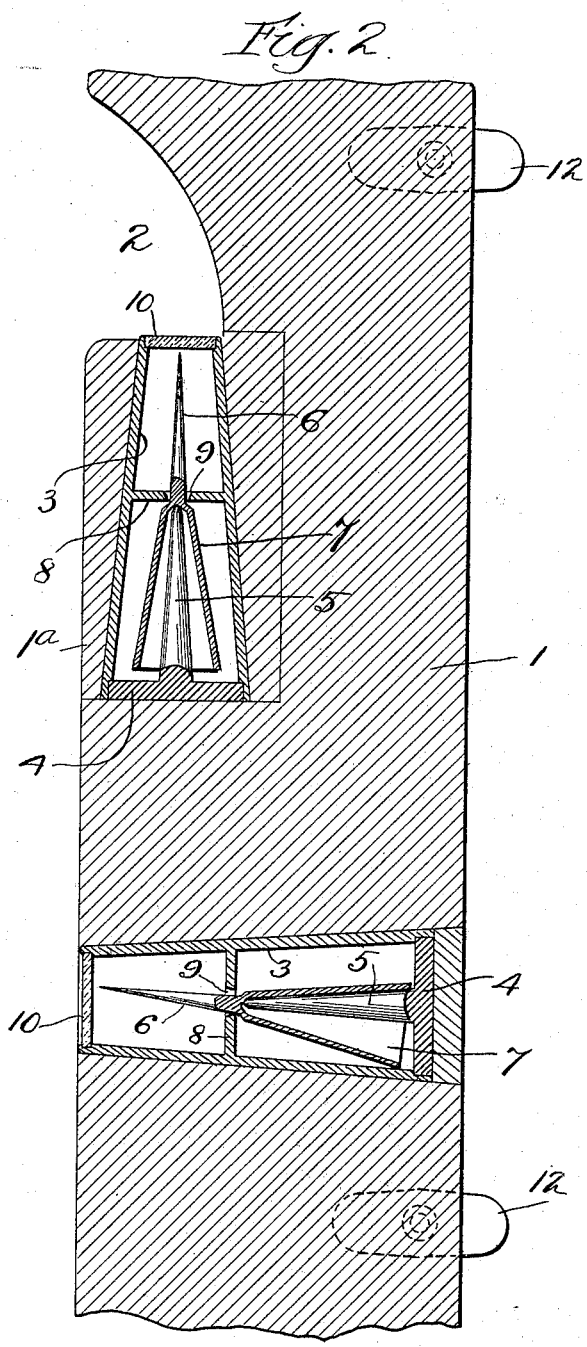

In the said drawings, Figure 1 is a perspective view of a combined plumb and level constructed according to my invention, and Fig. 2 is an enlarged longitudinal sectional view thereof.

In carrying out my invention I employ a floating indicator or pointer, or a pointer or indicator which is capable of oscillation in all directions, and whose extremity is directed toward an index to which the indicator points when the surface to which the plumb or level is applied is strictly plumb or does not slant in any direction. Obviously there are numerous ways in which such indicator may be made thus universally oscillatory or movable, so as to approach and recede from the index in any direction, and it being practically impossible to illustrate them all I shall show but one as a simple example of the embodiment of my invention, leaving the generic terms of the description and claims to include the others.

In illustrating my invention I have shown it in connection with an ordinary carpenter's plumb and level; but it will nevertheless be understood that the invention is equally applicable to all devices where it is desired to ascertain deviations from a horizontal plane or from the vertical.

Referring now more specifically to the construction shown in the drawings, 1 represents the stock or block of the plumb or level, usually provided with a straight edge to be placed against the surface to be tested. In order that this stock or block may be utilized as a plumb, one edge thereof, for convenience, may be cut away or notched, as shown at 2, and fitted in this notch, in any suitable recess in the block, is the casing 3 of my improved plumb or level. As shown in the drawings, this casing 3 is introduced into the stock 1 by cutting out a block $1^a$ and inserting the casing 3 from the lower end thereof and then replacing the block, as more clearly shown in Fig. 2, the casing 3, for convenience in fitting, being slightly conical.

Rising from the bottom 4 of the casing is a post or pivot 5, whose upper end is preferably pointed, and resting upon this pointed end is the pointer or indicator 6, which is counterbalanced thereon by means of a downwardly-extending weighted portion 7, which is preferably in the form of a bell, so as to accurately balance the pointer 6 and at the same time render it very sensitive to any movement tending to destroy its equilibrium. This bell-shaped weighted extension also constitutes a simple means for preventing the pointer or indicator from jumping out of place. This result may be further guarded against by a diaphragm 8, having an eye 9, through which the pointer 6 passes, the diaphragm being arranged in close proximity to the top of the bell, so as to prevent the bell from leaving its seat upon the post or pivot 5, and the eye 9 being flared upwardly, so as to permit of the free oscillation of the pointer 6 in all directions.

The upper end of the casing 3 is preferably closed by a glass 10, and for the sake of convenience the index is indicated upon this glass, the same being constituted by a pair of crossed lines 11, as shown in Fig. 1, the intersection of the lines 11 constituting the index.

With the invention thus described it will be seen that the inclination of a post or upright in any direction may be instantly detected by placing the stock thereagainst, with one edge of the stock parallel with the edge of the upright or post. For the sake of convenience in determining this parallelism one side of the stock may be provided with one or more pivoted buttons 12, which may be turned outwardly, so as to come against the side of the post or upright when using the device as a plumb and turned in out of the way when the device is used as a level.

In order that one and the same stock may be utilized for a plumb as well as for a level, the casing 3 and its contents are duplicated in one side thereof and arranged in such a manner that the indicator will be substantially at right angles to the one arranged longitudinally of the stock.

Having thus described my invention, what I claim as new, and desire to secure by Letters Patent, is—

1. A plumb or level having in combination a post having a vertically-projecting point, an indicator supported loosely upon said point and having a counterbalance projecting downwardly on both sides of said post and extending below the upper end of said post and balancing said indicator, and means for confining said indicator to its seat on said point, substantially as set forth.

2. A plumb or level having in combination a pointed post or pivot, an indicator supported loosely upon said pivot, and having a counterbalance projecting downwardly below the point of said pivot and balancing said indicator, and an eye through which said indicator loosely passes, substantially as set forth.

3. A plumb or level having in combination a post or pivot, a bell-shaped counterbalance seated upon said post, a pointer or indicator supported by said counterbalance and an index arranged opposite said indicator, substantially as set forth.

4. A plumb or level having in combination a post or pivot, an indicator oscillatory in all directions and balanced upon said pivot, an eye through which said indicator passes and an indicator arranged opposite said indicator, substantially as set forth.

WM. H. ATWOOD.

Witnesses:
F. A. HOPKINS,
EDNA B. JOHNSON.